(12) United States Patent
Reid

(10) Patent No.: US 11,886,841 B2
(45) Date of Patent: Jan. 30, 2024

(54) ARGUMENT HELPER FOR PYTHON PROGRAM EDITOR

(71) Applicant: Texas Instruments Incorporated, Dallas, TX (US)

(72) Inventor: Stephen Lindor Reid, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/017,634

(22) Filed: Sep. 10, 2020

(65) Prior Publication Data
US 2021/0103431 A1   Apr. 8, 2021

Related U.S. Application Data

(60) Provisional application No. 62/912,502, filed on Oct. 8, 2019.

(51) Int. Cl.
*G06F 8/33* (2018.01)

(52) U.S. Cl.
CPC ..................... *G06F 8/33* (2013.01)

(58) Field of Classification Search
CPC ....................................... G06F 8/33
See application file for complete search history.

(56) References Cited

U.S. PATENT DOCUMENTS

| | | | | | |
|---|---|---|---|---|---|
| 6,026,233 | A * | 2/2000 | Shulman | .............. | G06F 8/33 715/201 |
| 7,631,293 | B2 * | 12/2009 | Alcorn | .............. | G06F 9/541 717/108 |
| 8,051,408 | B1 * | 11/2011 | Johnson | .............. | G06F 8/436 715/705 |
| 10,691,420 | B1 * | 6/2020 | Breslau | .............. | G06F 8/33 |
| 2006/0026559 | A1 * | 2/2006 | Gunturi | .............. | G06F 8/33 717/110 |
| 2006/0036996 | A1 * | 2/2006 | Low | .............. | G06F 8/36 717/113 |
| 2010/0083225 | A1 * | 4/2010 | Giat | .............. | G06F 8/33 717/111 |
| 2013/0263086 | A1 * | 10/2013 | Carter | .............. | G06F 8/33 717/113 |

(Continued)

OTHER PUBLICATIONS

Marko Gasparic et al., "A graphical user interface for presenting integrated development environment command recommendations: Design, evaluation, and implementation," 2017 [retrieved on Aug. 11, 2023], Information and Software Technology 92, pp. 236-255, downloaded from: <url>:https://www.sciencedirect.com (Year: 2017).*

*Primary Examiner* — S. Sough
*Assistant Examiner* — Stephen D Berman
(74) *Attorney, Agent, or Firm* — Charles F. Koch; Frank D. Cimino

(57) ABSTRACT

A method for Python programming on a handheld device is provided that includes activating, by a Python program editor executing on the handheld device and responsive to programmer input, a first argument helper for a first parameter of a Python function, wherein the first argument helper includes first valid argument values for the first parameter, receiving, by the Python program editor, programmer selection of a first valid argument value of the first valid argument values, and displaying, by the Python program editor, the Python function with the first valid argument value in an editor screen.

13 Claims, 14 Drawing Sheets

(56) References Cited

U.S. PATENT DOCUMENTS

| | | | |
|---|---|---|---|
| 2016/0111018 A1* | 4/2016 | Sousa | G09B 19/0053 |
| | | | 434/118 |
| 2016/0188301 A1* | 6/2016 | Zang | G06F 8/33 |
| | | | 717/113 |
| 2018/0024816 A1* | 1/2018 | Au | G06F 8/33 |
| | | | 717/108 |
| 2020/0167134 A1* | 5/2020 | Dey | G06F 8/65 |

* cited by examiner

200

```
EDITOR: TEST
PROGRAM LINE 0006 import ti_plotlib as plt plt.grid(,,"solid")
plt.pen("medium","dot")
from vernier import *
_vernier("IN 1","TEMPERATURE")
```
2302

| Fns... | a A # | Tools | Run | Files |

```
EDITOR: TEST
PROGRAM LINE 0006 import ti_plotlib as plt plt.grid(,,"solid")
plt.pen("medium","dot")
from vernier import *
tp=vernier("IN 1","TEMPERATURE")
```

| Fns... | a A # | Tools | Run | Files |

ARGUMENT HELPER FOR PYTHON PROGRAM EDITOR

CROSS-REFERENCE TO RELATED APPLICATIONS

This application claims benefit of U.S. Provisional Patent Application No. 62/912,502 filed Oct. 8, 2019, which is incorporated herein by reference in its entirety.

BACKGROUND

The Python programming language is becoming important in the field of education as a learning tool for algorithmic thinking and for developing programming skills of students. Further, a version of Python, referred to as MicroPython, has been adapted to run on various handheld devices used in the classroom, e.g., graphing calculators such as the TI-83 Premium CE graphing calculator from Texas Instruments, Inc., allowing students to develop programs and use built-in Python functions on such devices. As students are learning to develop Python programs and to use built-in Python functions on handheld devices, it is important that they are aware of what inputs are valid as providing an incorrect value can cause a runtime error or invalid operation of a program.

SUMMARY

Embodiments of the present disclosure relate to argument helpers in Python program editing on a handheld device. In one aspect, a method for Python programming on a handheld device is provided that includes activating, by a Python program editor executing on the handheld device and responsive to programmer input, a first argument helper for a first parameter of a Python function, wherein the first argument helper includes first valid argument values for the first parameter, receiving, by the Python program editor, programmer selection of a first valid argument value of the first valid argument values, and displaying, by the Python program editor, the Python function with the first valid argument value in an editor screen.

In one aspect, a handheld device is provided that includes a non-transitory computer-readable medium storing software instructions for Python programming, wherein the software instructions include software instructions to activate, by a Python program editor executing on the handheld device and responsive to programmer input, a first argument helper for a first parameter of a Python function, wherein the first argument helper includes first valid argument values for the first parameter, receive, by the Python program editor, programmer selection of a first valid argument value of the first valid argument values, and display, by the Python program editor, the Python function with the first valid argument value in an editor screen, and at least one processor coupled to the non-transitory computer-readable medium to execute the software instructions.

BRIEF DESCRIPTION OF THE DRAWINGS

FIGS. 18-24 are an example illustrating automatic placement of the editor cursor in a Python program editor screen after using an argument helper;

DETAILED DESCRIPTION

Figure 1:
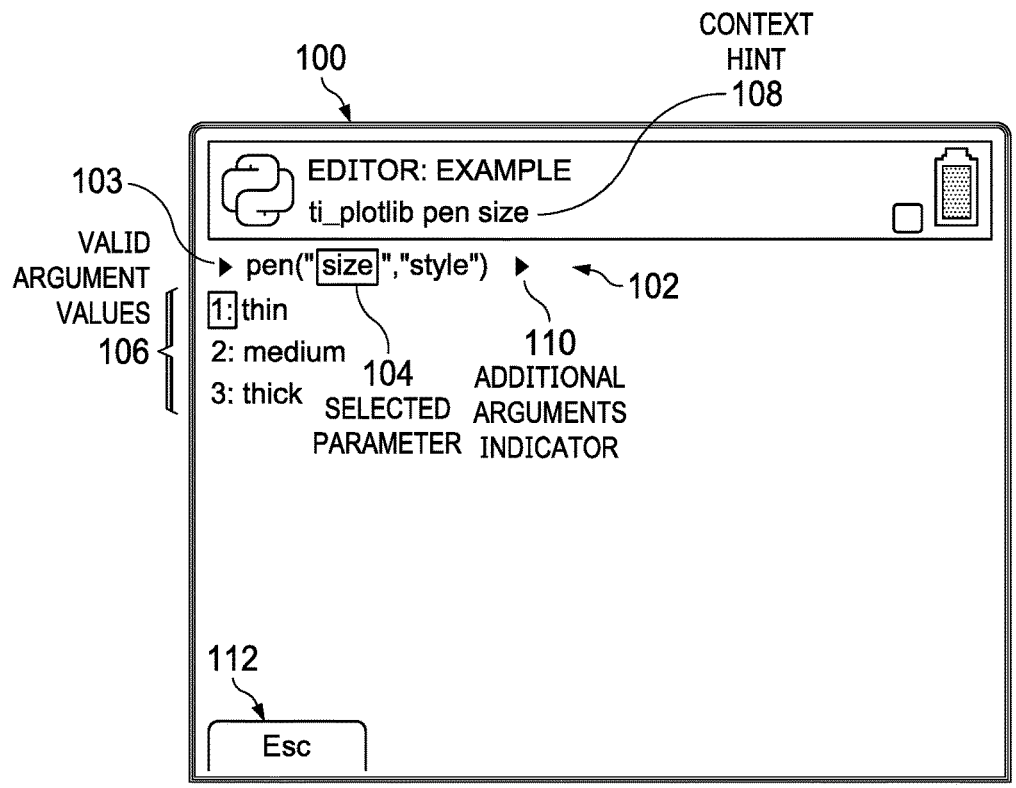
FIG. 1 is an example illustrating an argument helper for a parameter of a built-in Python function.

Specific embodiments of the disclosure are described herein in detail with reference to the accompanying figures. Like elements in the various figures are denoted by like reference numerals for consistency.

Embodiments of the disclosure provide functionality for guiding a programmer using a Python program editor on a handheld device, e.g., a graphing calculator, through the process of filling in valid argument values of parameters of built-in Python functions. More specifically, for some parameters of some built-in Python functions, valid options for an argument value of a parameter are displayed in a menu for selection by the programmer. A menu of valid argument values is referred to as an 'argument helper' or 'argument helper menu' herein. In some embodiments, after the programmer completes selection of one or more argument values for a Python function using argument helper menus, the Python function is displayed with the selected argument values and the editor cursor is automatically placed at a logical position for programmer input in the program being developed, e.g., at a parameter for which the programmer needs to provide a value or at the end of the displayed function.

The argument helpers reduce the amount of typing by a programmer and ensure that argument values are valid and correctly spelled. In a classroom environment where many students are typing in the same program, reducing typographical errors assists in the smooth and uninterrupted flow of information from teacher to student and reduces the time needed to get arguments properly entered. Further, by reducing the possibility of typographical errors, the class can remain better focused on the lesson and the time the teacher may need to assist students who make entry errors may be reduced.

FIG. 1 is an example illustrating an argument helper for a parameter 104 of a built-in Python function 102 in a Python program editor screen 100 on a handheld device in accordance with some embodiments. In this example, the pen( ) built-in Python function 102 has been included in a Python program under development in a Python program editor and the programmer has selected the function, i.e., moved the editor cursor to a line on the screen containing the function and pressed the 'Enter' key on the keypad of the handheld device. The selection of the function caused the Python program editor to automatically activate the displayed argument helper for filling in the argument value for the "size" parameter 104. In this example and other examples herein, parameters having argument helpers are string parameters denoted by " " but are not visually distinguished from other string parameters having no argument helpers. However, an incoming arrow 103 is displayed to the left of the function name to indicate the presence of one or more parameters with argument helpers. In other embodiments, other indicia may be used to denote parameters with argument helpers such as, for example, color, italicized or bold font, etc.

The "size" parameter 104 is currently selected and the valid argument values 106 for this parameter are displayed on the screen 100. The programmer can select one of the argument values 106 to be filled in for the selected "size" parameter 104 of the pen( ) function in the program under development. Further, a context hint 108 is provided. Because the function pen( ) has a second parameter "style" with an argument helper, an additional arguments indicator 110 in the form of an outgoing arrow is also displayed at the end of the line to cue the programmer. In this example, the additional arguments indicator is a right pointing arrow. In other embodiments, other indicia may be used such as, for example, an asterisk, a caret, etc. After the programmer selects a value for the parameter "size", the argument helper for the parameter "style" will be automatically activated by the Python program editor.

An ESC softkey label 112 is displayed at the bottom of the screen 100. A programmer can select this softkey at any point to exit the argument helper. If the softkey is selected, the argument helper is terminated and the function pen( ) is pasted into the program being edited with the current state of argument value selection. If no value has been selected for the parameter "size" when ESC 112 is selected, the function is pasted with the parameter "size" empty, i.e., as " ". Further, the other parameter "style" is also pasted as empty as no value has been selected for it. If a value has been selected for "size" but not "style", the function pen( ) is pasted with the selected value for "size" and with the "style" parameter empty. The Python program editor also positions the editor cursor appropriately for the programmer to enter the argument value(s) manually.

Figure 2:
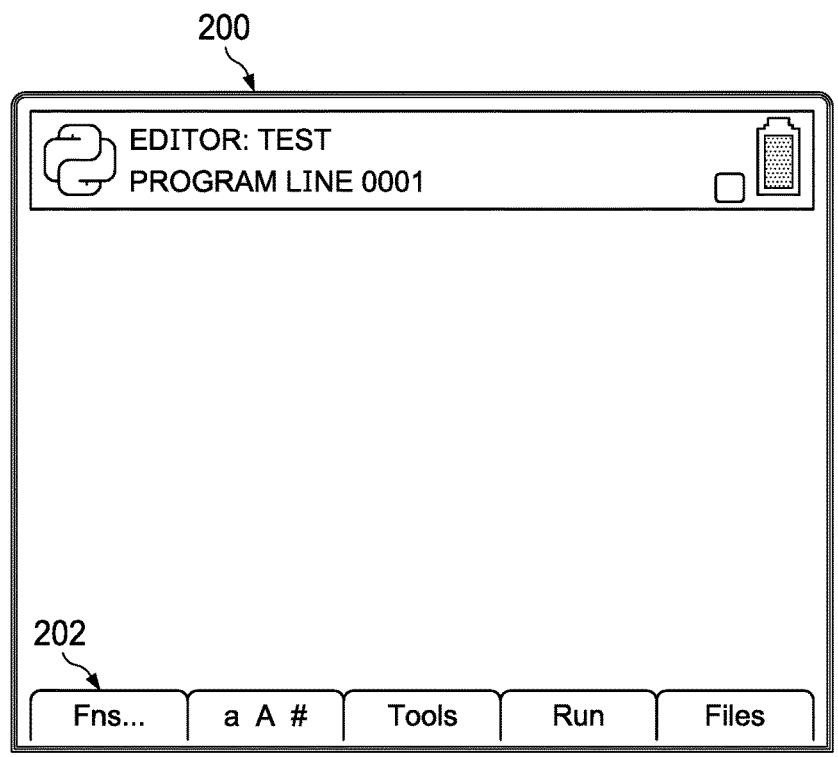
FIGS. 2-17 are an example illustrating the use of argument helpers in creating a Python program on a handheld device.
Figure 3:
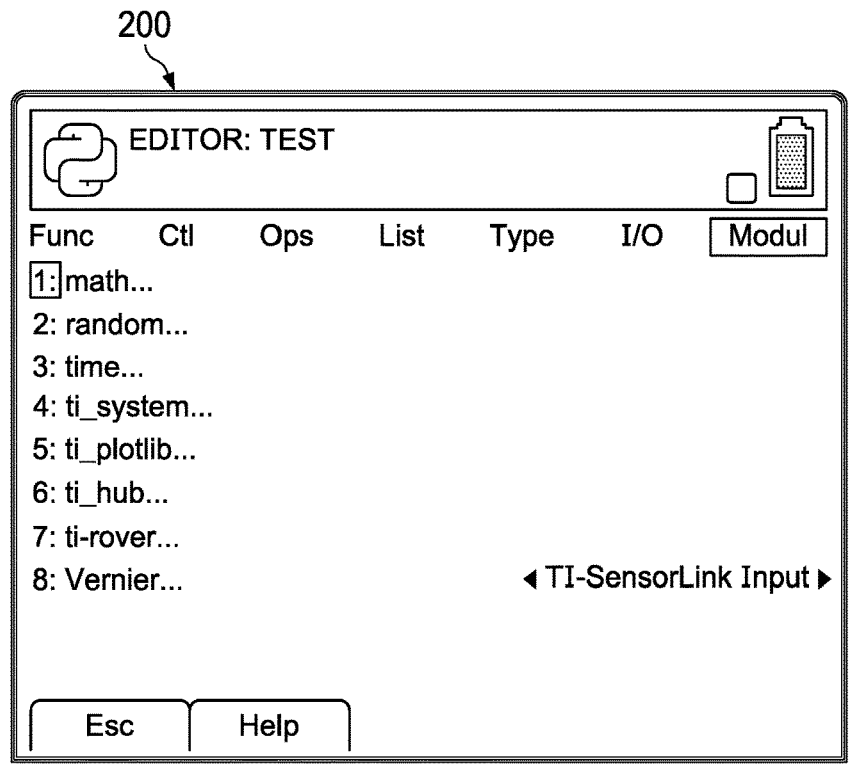
Figure 4:
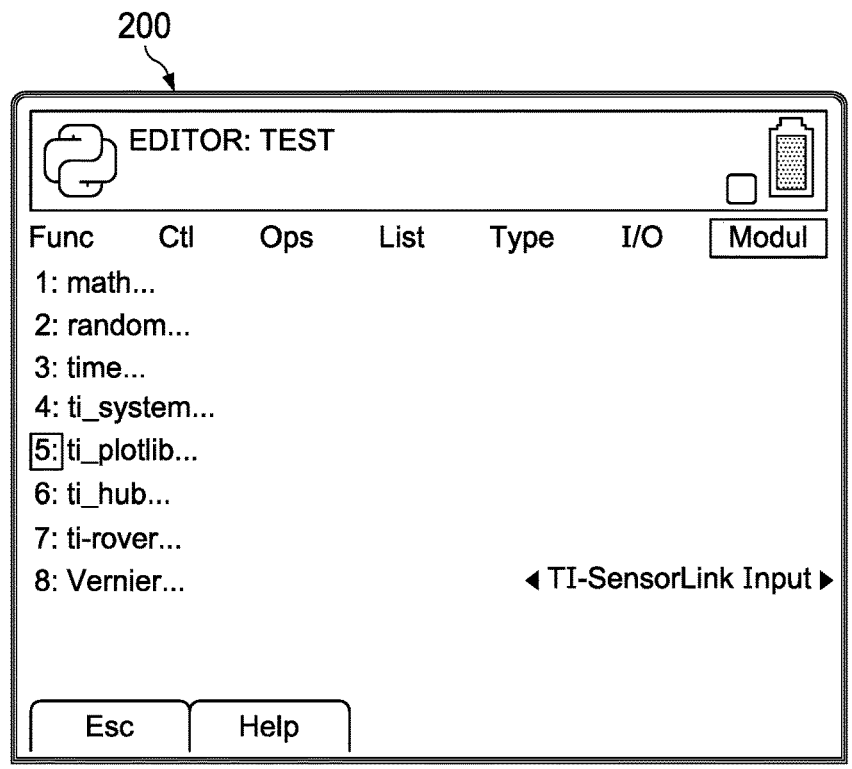
Figure 5:
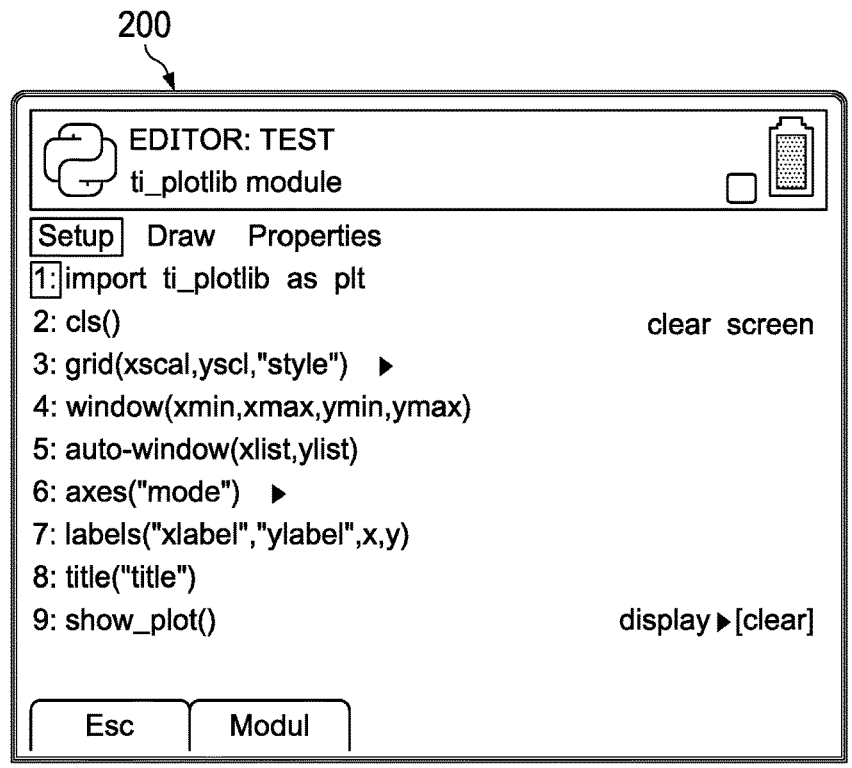

FIGS. 2-17 are an example illustrating the use of argument helpers in creating a Python program on a handheld device in accordance with one or more embodiments. The example begins with an empty Python program editor screen 200 displayed on the handheld device as shown in FIG. 2. The programmer selects the functions softkey Fns . . . 202 to display a list of built-in Python modules that can be imported into a program. FIG. 3 displays the list of available Python modules. The programmer then selects the ti_plotlib module as shown in FIG. 4 which causes a list of Python functions for setting up or configuring the ti_plotlib module to be displayed as shown in FIG. 5. The ti_plotlib module provides Python functions for drawing lines, points, scatter plots, and linear regression equations in a graphical form, as well as graph axes, text, labels, etc.

Figure 6:
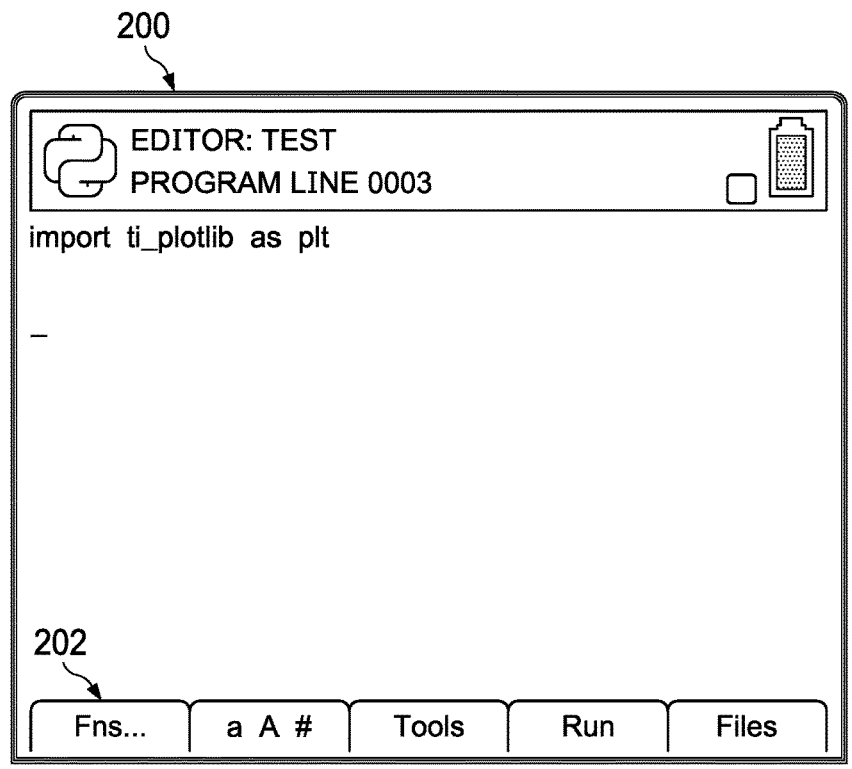
Figure 7:
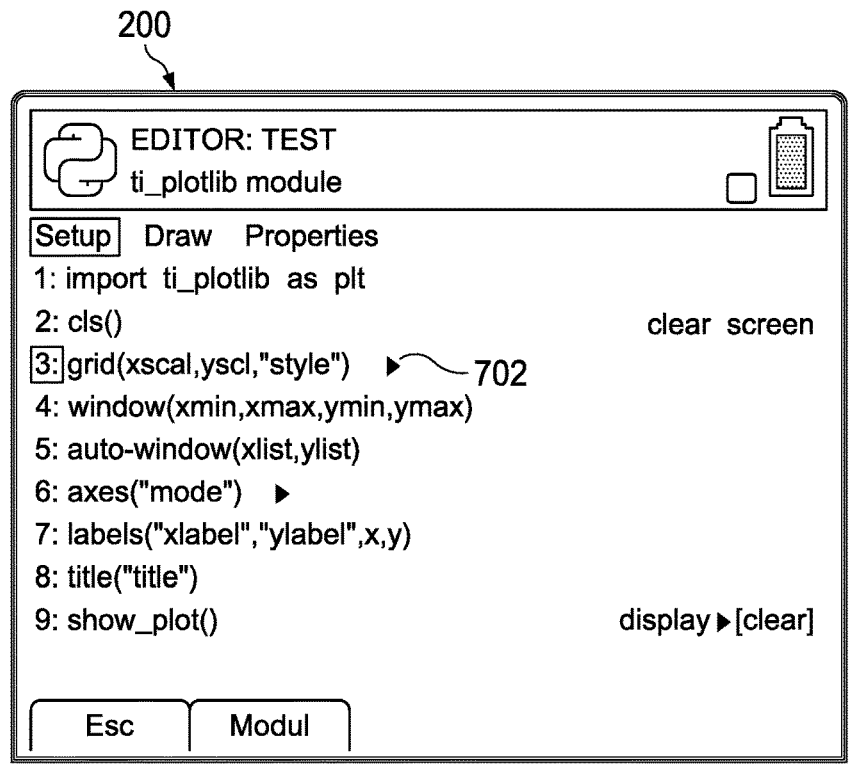

To include the module in the program being developed, the module needs to be imported. The programmer selects the first item in the displayed list which causes the Python program editor to add the import command as the first line of the program being developed as shown in FIG. 6. Note that the ti_plotlib is imported as a Python object with the name 'plt'. The programmer then selects the softkey Fns . . . 202 again to redisplay the list of modules (see FIG. 3) and again selects the ti_plotlib module (see FIG. 4). As illustrated in FIG. 7, the programmer selects the grid( ) function, which has one parameter "style" configured with an argument helper. The outgoing arrow 702 visually indicates to the programmer that a string parameter of the function grid( ) has an argument helper.

Figure 8:
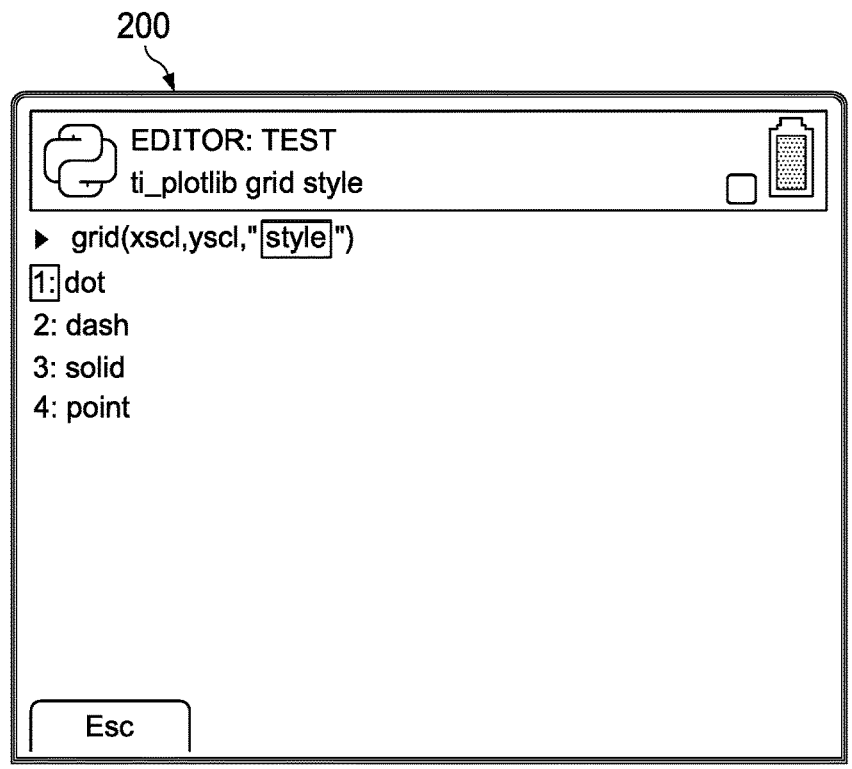

When the programmer selects the grid( ) function, the argument helper for "style" is automatically activated by the Python program editor and the valid argument values for the parameter "style" are displayed on the program editor screen 200 as shown in FIG. 8. Because there is no outgoing arrow at the end of the line to indicate another argument helper, e.g., the additional arguments indicator 110 of FIG. 1, the programmer is visually prompted that "style" is the only parameter for the grid( ) function that has an argument helper.

Figure 9:
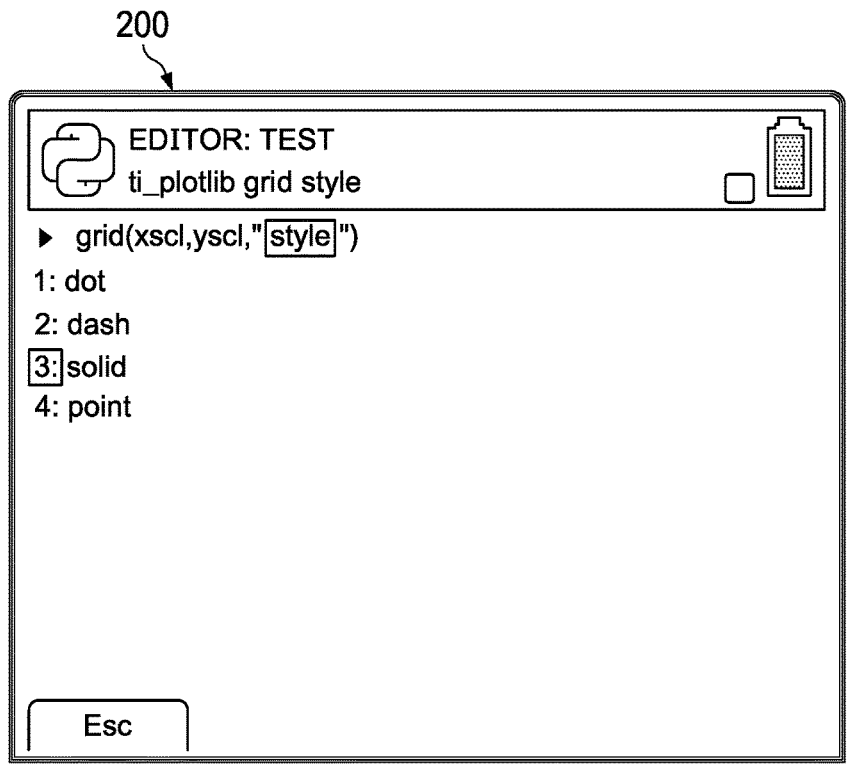
Figure 10:
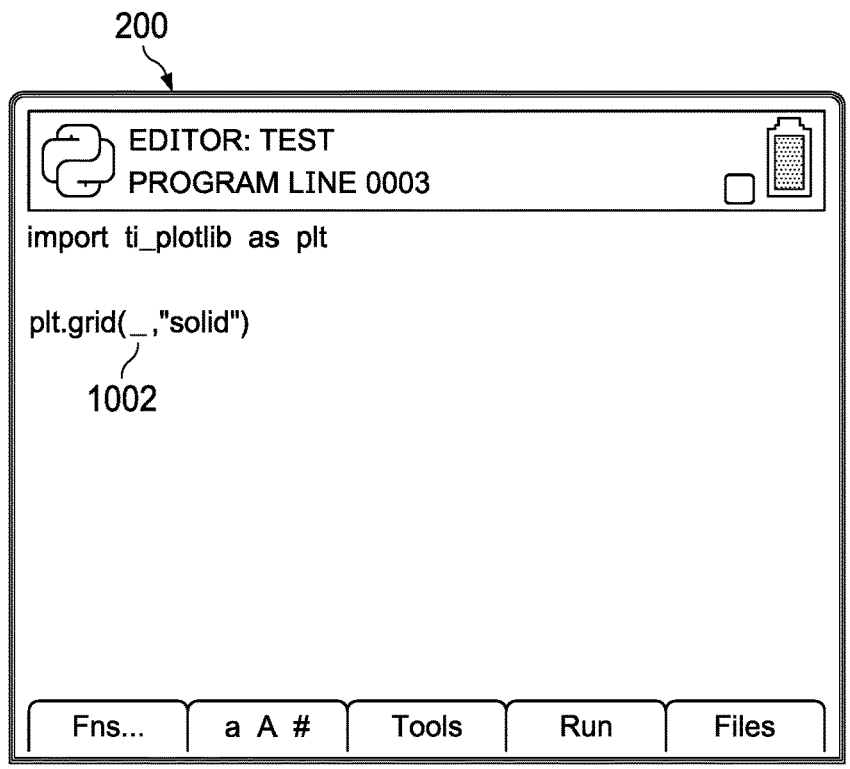

As illustrated in FIG. 9, the programmer selects the 'solid' option for the argument value of the parameter "style". When the programmer makes this selection, the grid( ) function and the selected argument value are then pasted in the program under development in the editor screen 200 as shown in FIG. 10. As shown in FIG. 7, the grid( ) function has two additional parameters, an x scale and a y scale, that need to filled in. As illustrated in FIG. 10, The Python program editor automatically positions the editor cursor 1002 at the point where the programmer should enter the desired value for the first of these two parameters. Note that the function grid( ) is pasted with the name 'plt.grid'. In Python, functions within an imported module have a prefix with the name of the imported module, which in this case is 'plt'.

Figure 11:
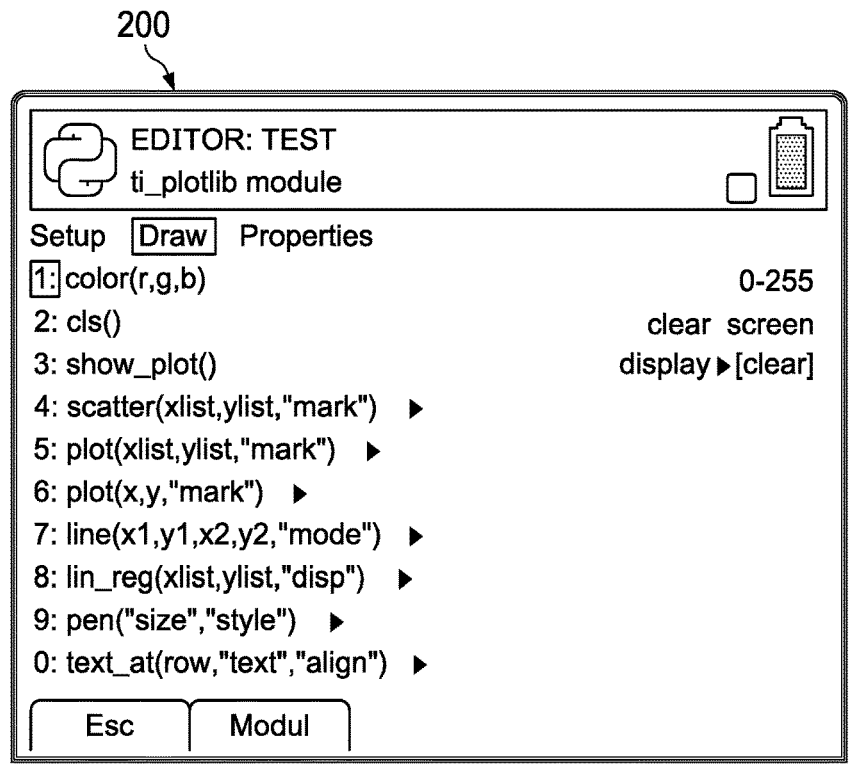
Figure 12:
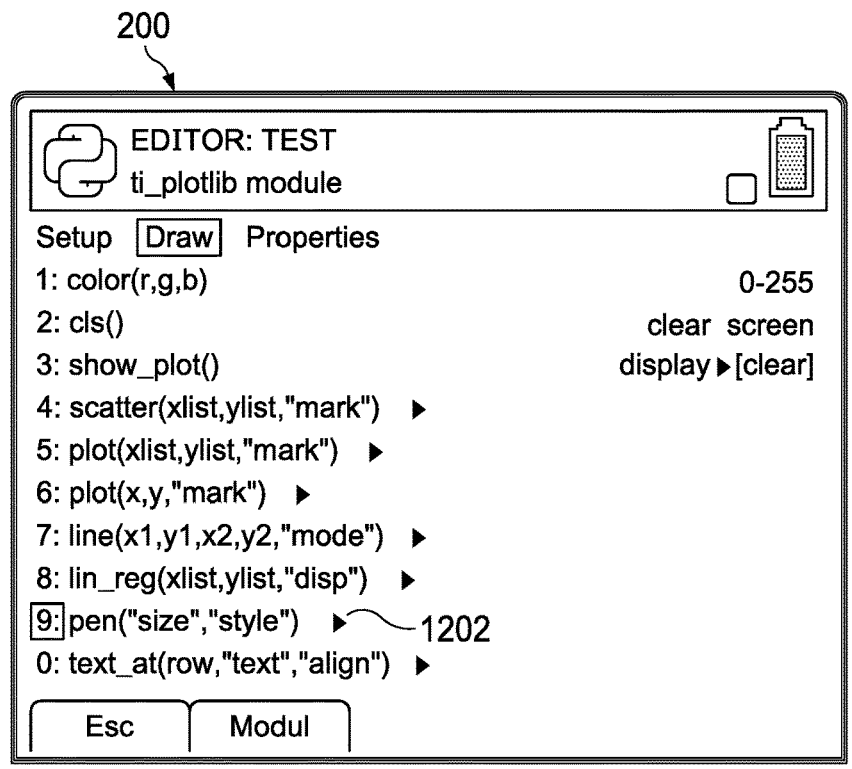

After filling in the other parameters of the grid( ) function (or instead of the filling in the other parameters), the programmer can select other functions from the ti_plotlib module to be included in the program under development. To make the selection, the programmer selects the softkey Fns . . . 202 again to redisplay the list of modules (see FIG. 3) and again selects the ti_plotlib module (see FIG. 4). As illustrated in FIG. 11, the programmer then chooses to see the list of "Draw" functions included in module. As illustrated in FIG. 12, the programmer selects the pen( ) function, which has two parameters "size" and "style". The outgoing arrow 1202 at the end of the line displaying the pen( ) function indicates that there is at least one argument helper for at least one of the string parameters.

Figure 13:
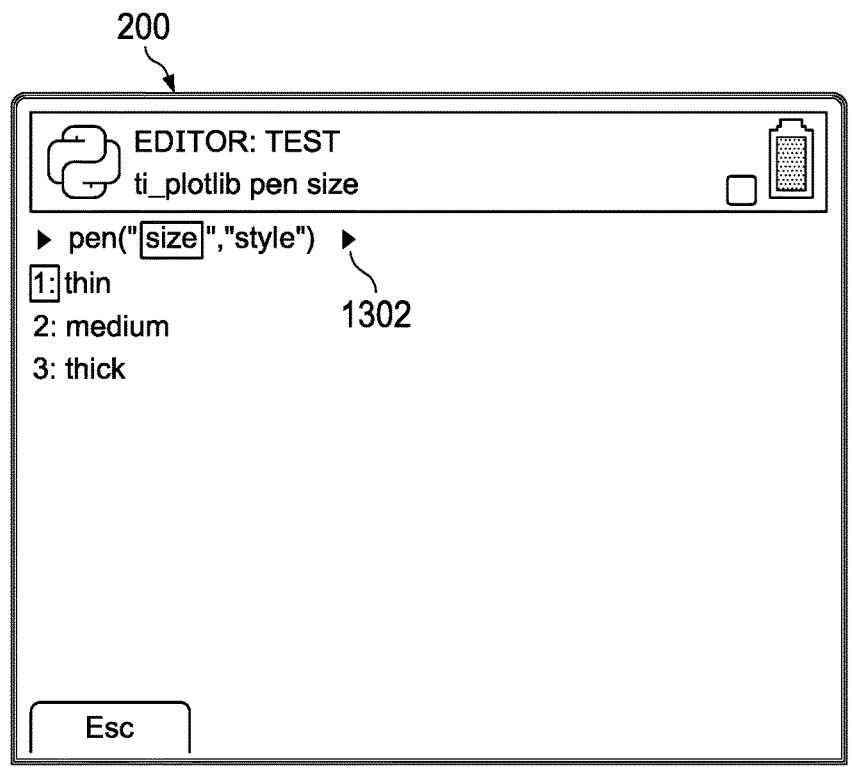
Figure 14:
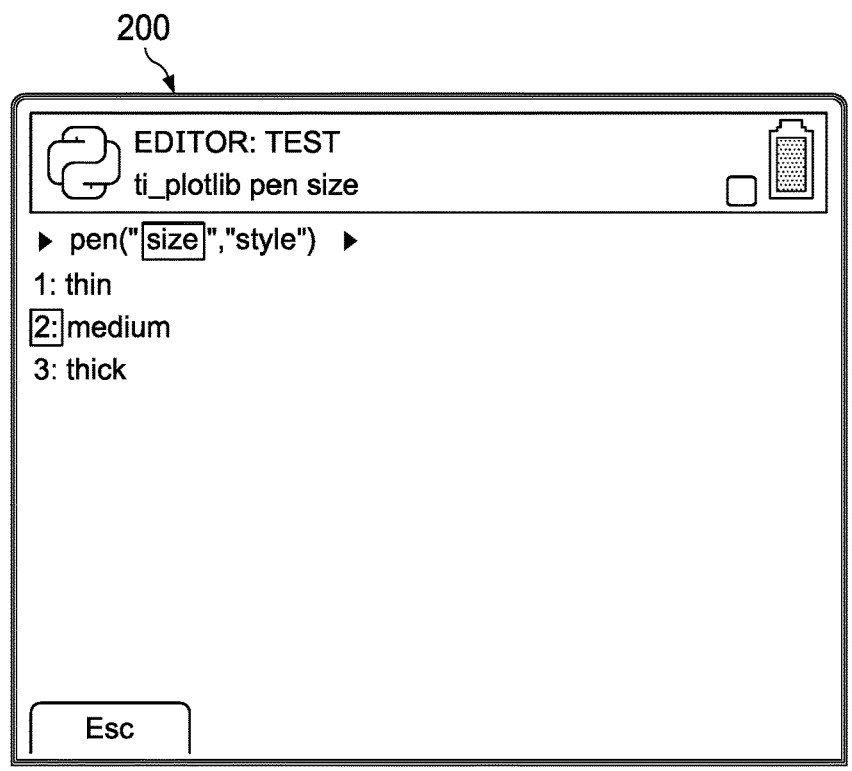

When the programmer selects the pen( ) function, the argument helper for the "size" parameter is automatically activated by the Python program editor, as shown in FIG. 13. An outgoing arrow 1302 is displayed at the end of the pen( ) function to indicate that another parameter of the function also has an argument helper that will be activated once an argument value for the parameter "size" is selected. As illustrated in FIG. 14, the programmer selects the argument value 'medium' for the "size" parameter.

Figure 15:
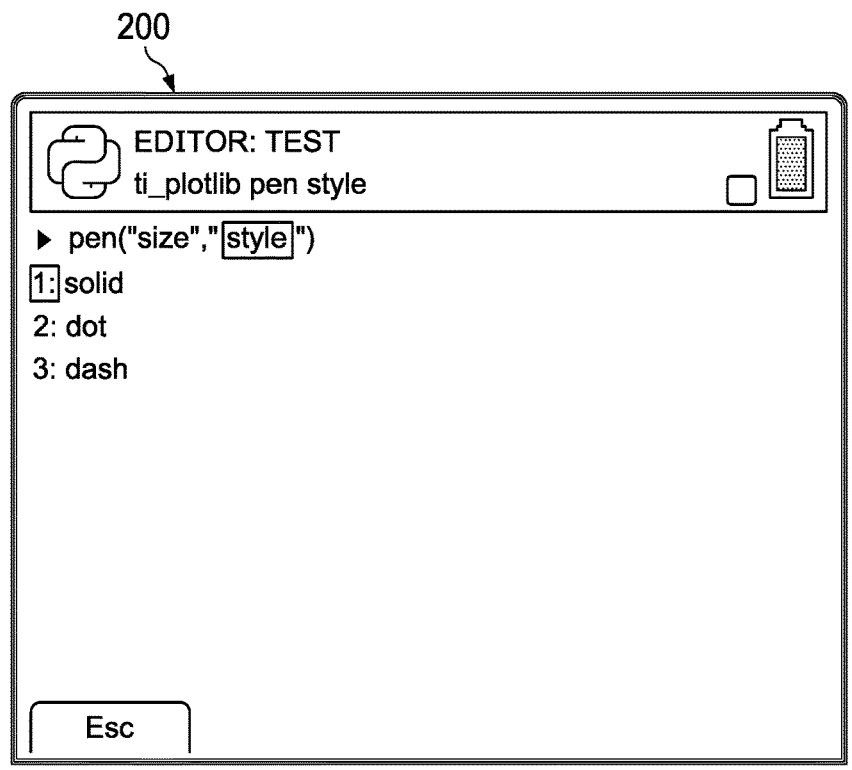
Figure 16:
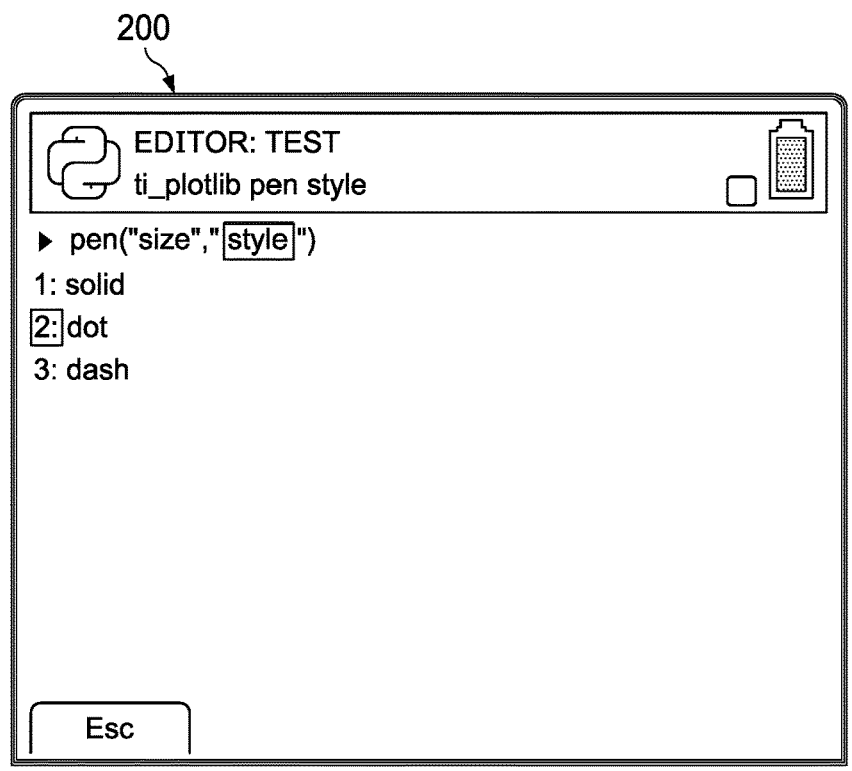
Figure 17:
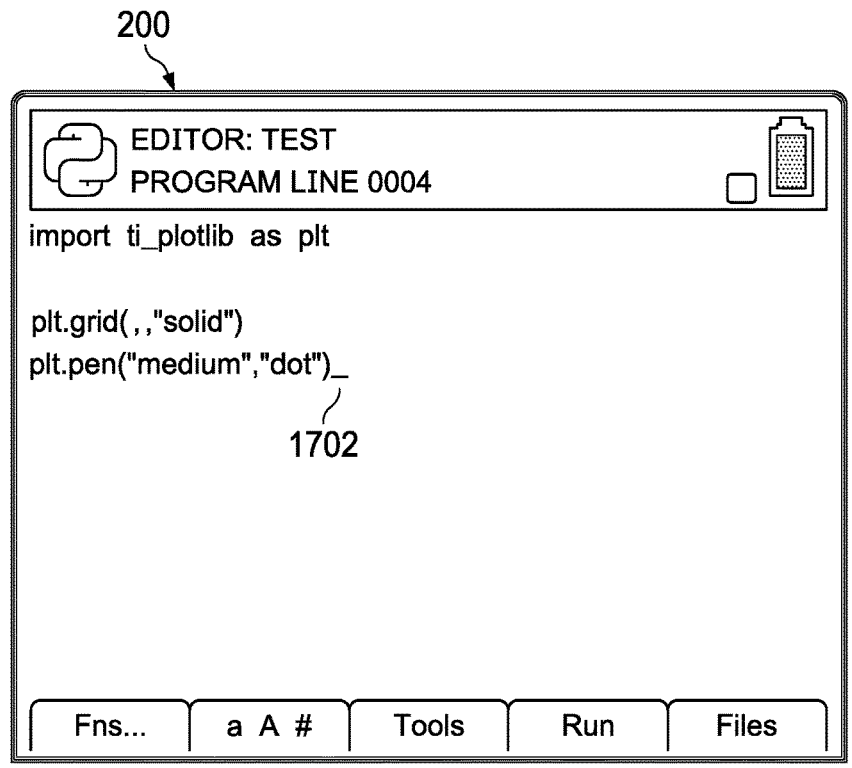

When the programmer makes this selection, the argument helper for the "style" parameter is automatically activated by the Python program editor, as shown in FIG. 15. As illustrated in FIG. 16, the programmer selects the argument value 'dot' for the "style" parameter. When the programmer makes this selection, the pen( ) function with the two argument value selections is pasted in the program under development in the editor screen 200 as shown in FIG. 17. The pen( ) function has no additional parameters, so the Python program editor places the editor cursor 1702 at the end of the function.

Figure 18:
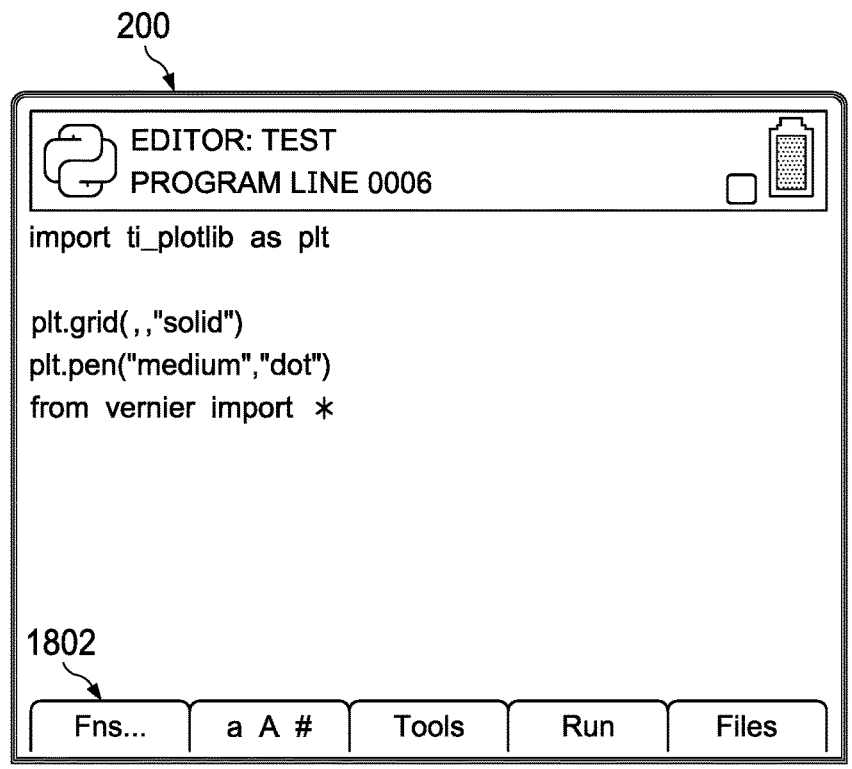
Figure 19:
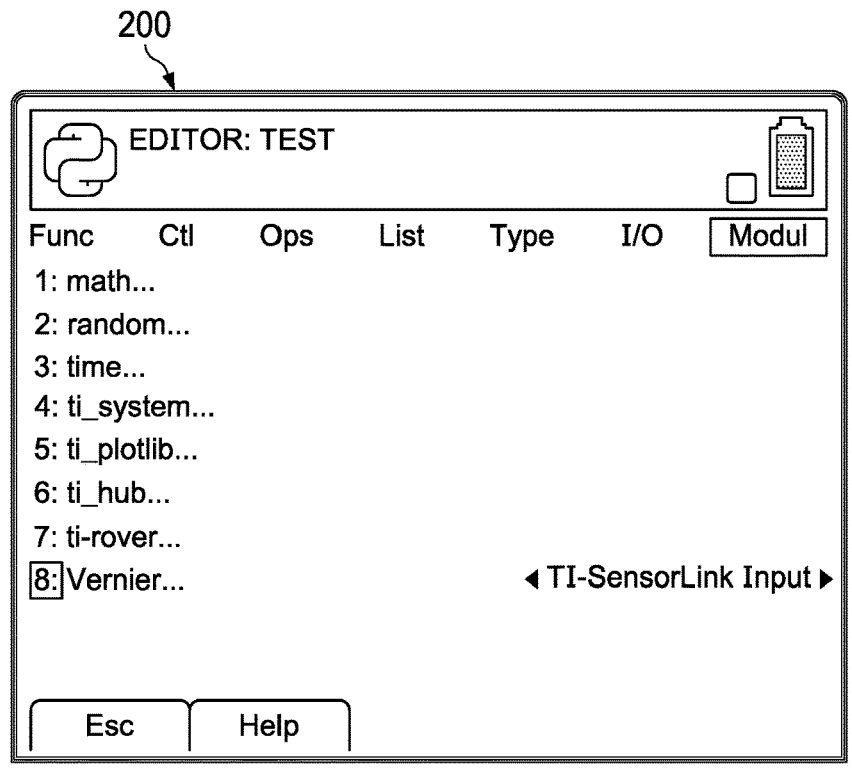
Figure 20:
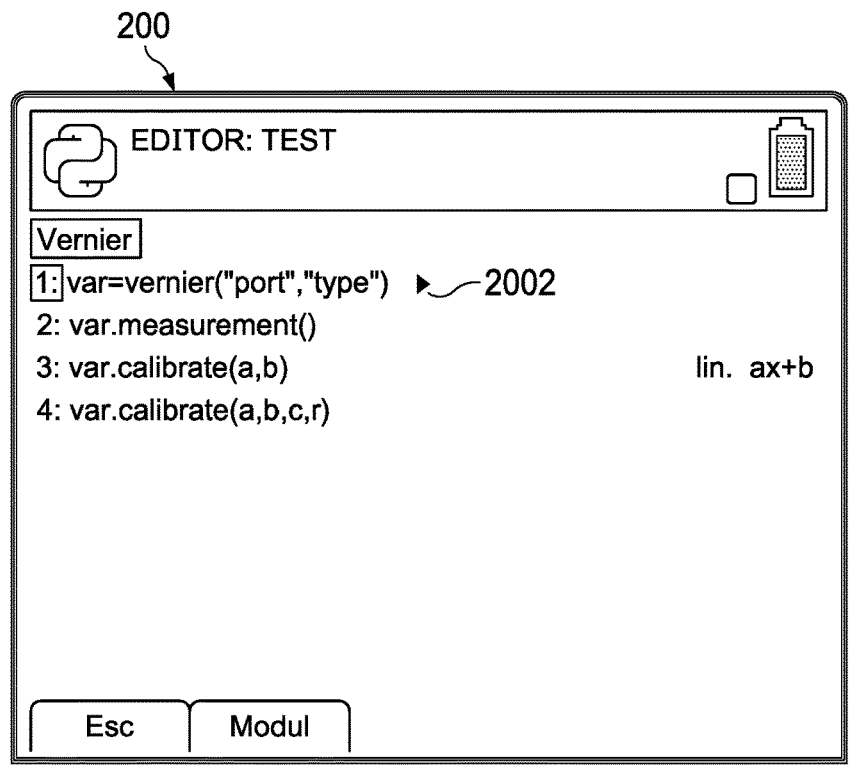

FIGS. 18-24 are an example illustrating automatic placement of the editor cursor in a Python program editor screen after using an argument helper in accordance with some embodiments. As shown in FIG. 18, in this example, the programmer has imported into the program under development a module of functions for interfacing to a Vernier sensor coupled to the handheld device. After the Vernier module is imported, the programmer selects the softkey Fns . . . 1802 to display the list of all available modules and selects the imported Vernier module as shown in FIG. 19. As illustrated in FIG. 20, this selection causes a list of functions in the Vernier module to be displayed. The statement in the initial line creates a Vernier object that allows access to the various functions or methods of the object shown in the list of functions and assigns the object to a programmer specified variable name which is indicated by 'var'.

Figure 21:
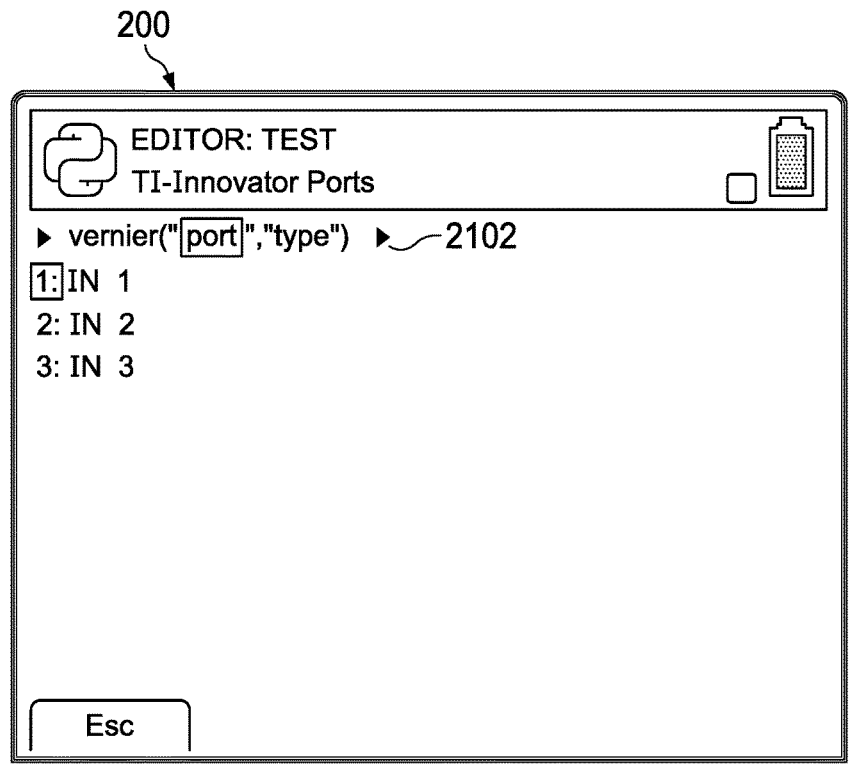

To use the Vernier object to access the sensor, the programmer needs to specify the port to be used to access the sensor and the type of sensor. The programmer selects the first line in the displayed list, which has an outgoing arrow 2002 indicating that at least one argument helper is available for one of the string parameters. When the programmer selects this line, an argument helper for the "port" parameter is automatically activated by the Python program editor, as illustrated in FIG. 21. Note that there is an outgoing arrow 2102 indicating that another parameter, in this case the "type" parameter, also has an argument helper. The programmer selects the first option, 'IN 1', from the list presented by the argument helper as the argument value for the "port" parameter.

Figure 22:
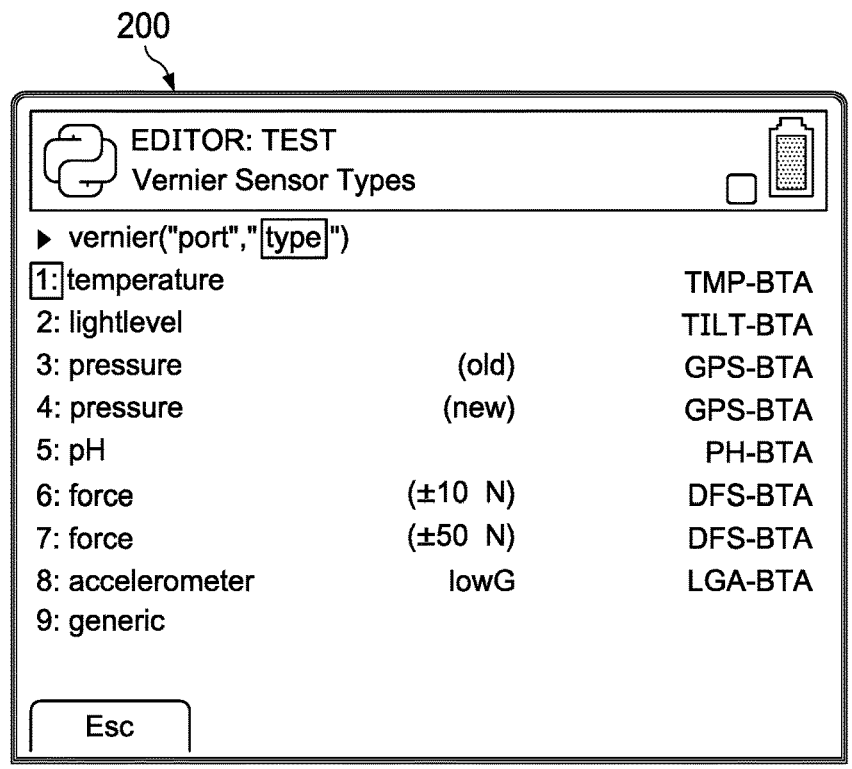

As illustrated in FIG. 22, The selection of the option causes the Python program editor to automatically activate the argument helper for the parameter "type" which specifies the type of the sensor. Note that there is no outgoing arrow at the end of the top line in the screen 200, thus indicating that there are no further argument helpers for this function. The programmer selects the first option, 'temperature', as the argument value for the parameter "type", which terminates the argument helper.

The Vernier function with the selected argument values is then automatically pasted into the program under development in the editor screen 200 as shown in FIG. 23. As illustrated in FIG. 20, the output of the Vernier function needs to be assigned to a variable. Because the programmer has not yet specified the variable, the Python program editor automatically positioned the editor cursor 2302 at the beginning of the line to prompt the programmer to enter a variable name. The programmer then enters a variable name as illustrated in FIG. 24 to complete specification of the function. If the variable name was already present, and no additional parameters needed to be filled in, the Python program editor would position the editor cursor at the end of the line. If the variable name was already present, and there were additional parameters to be filled in, the Python program editor would place the editor cursor in the correct position to prompt the programmer to fill in the next parameter.

Figure 25:
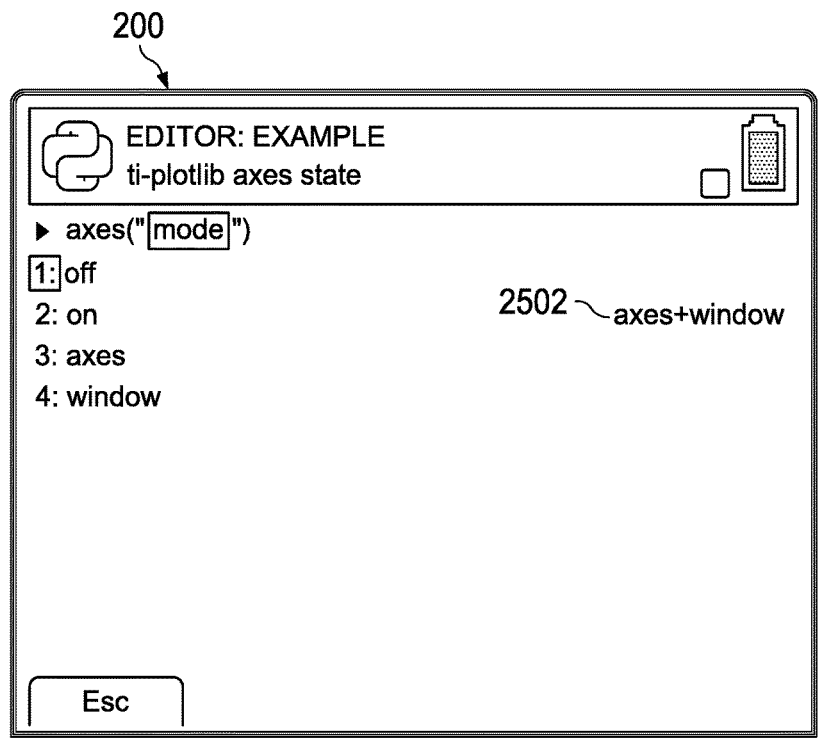
FIG. 25 is an example illustrating the use of a hint in an argument helper.

In some embodiments, an argument helper can include one or more hints associated with argument values to provide additional information to the programmer as to the use of the parameter and/or the function of the parameter. FIG. 25 is an example illustrating the use of a hint in an argument helper in accordance with one or more embodiments. In this example, the argument helper is for a "mode" parameter for the axes of a plot. The mode can be one of "on", "off", "axes", or "window". A hint 2502 is provided for the "on" argument value that indicates to the programmer that selecting this argument value provides the functionality of displaying both the axes and the window range values when a plot is drawn.

Figure 26:
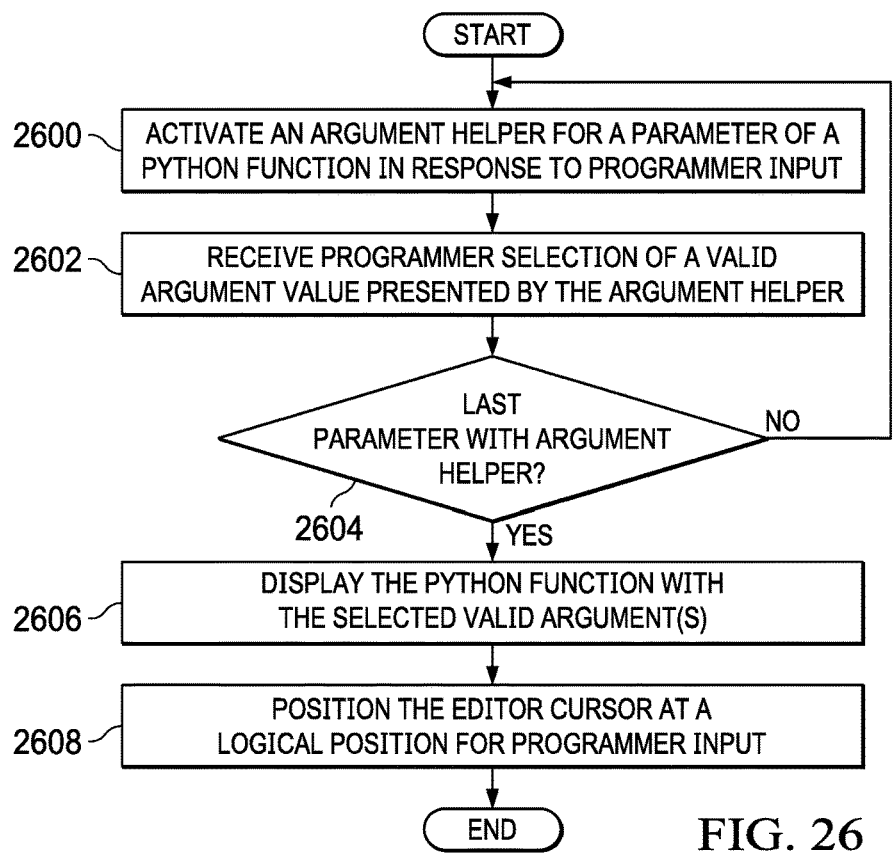
FIG. 26 is a flow diagram of a method for providing argument help in a Python program editor executing on a handheld device.

FIG. 26 is a flow diagram of a method for providing argument help in a Python program editor executing on a handheld device. Initially, an argument helper for a parameter of a Python function is activated 2600 by the Python program editor in response to programmer input, e.g., the programmer selects a line on the editor screen displaying a Python function having at least one parameter with an argument helper. The Python editor then receives 2602 programmer selection of a valid argument value from the valid argument values presented by the argument helper. If the parameter is the last parameter of the Python function having an argument helper 2604, then the Python program editor displays 2606 the Python function on an editor screen with any valid argument values that have been selected from the activated argument helpers and positions 2608 the editor cursor at a logical position for programmer input. If the parameter is not the last parameter of the Python function having an argument helper 2604, the method continues with activation 2600 of the next argument helper.

Figure 27:
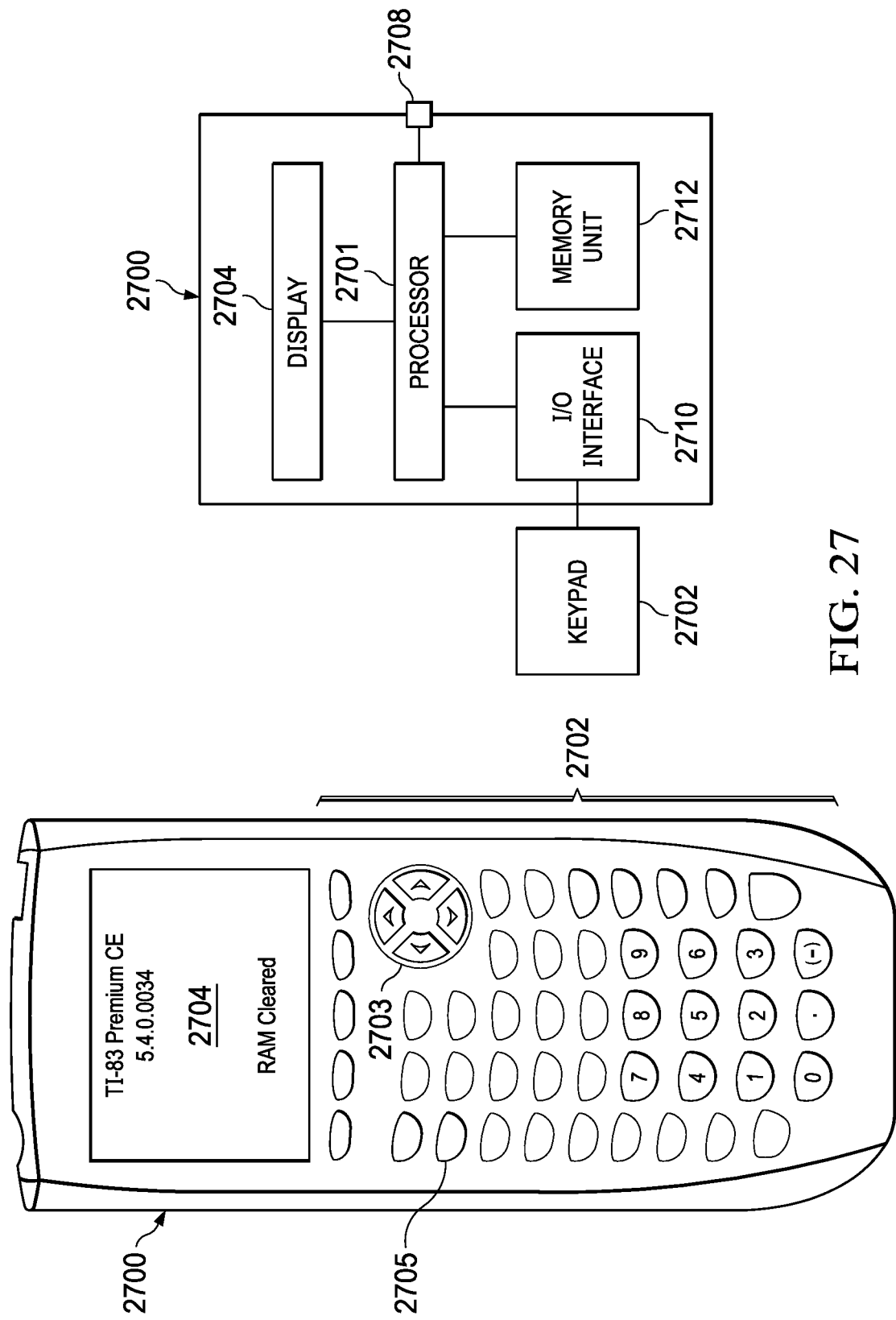
FIG. 27 is a block diagram of an example handheld device.

Embodiments described herein can be implemented on any suitably configured handheld device, e.g., a handheld graphing calculator, providing Python programming functionality. FIG. 27 is an example of a handheld graphing calculator 2700, i.e., the TI-83 Premium CE graphing calculator, configured to provide argument helpers for parameters of Python functions as described herein. The handheld calculator 2700 includes a display screen 2704, and a keypad 2702. The display screen 2704 can be used to display, among other things, information input to applications executing on the handheld graphing calculator 2700 and various outputs of the applications. For example, the display screen 2704 may be used to display the screens of a Python program editor as described herein. The display screen 2704 may be, for example, an LCD display.

The keypad 2702 allows a user to enter data and commands and to start and interact with applications executing on the handheld graphing calculator 2700. The keypad 2702 includes a keyboard with both numeric and alphabetic functionality for entering text and numbers and a set of arrow keys 2703 that can be used, for example, to move an editor cursor in a Python program editor screen. The ALPHA key 2705 can be used to toggle among numeric input, lower-case alphabetic input, and upper-case alphabetic input.

The handheld graphing calculator 2700 includes a processor 2701 coupled to a memory unit 2712, e.g., a non-transitory computer-readable medium, which may include one or both of memory for program storage, e.g., read-only memory (ROM), and memory for non-persistent data and program storage, e.g., random-access memory (RAM). In some embodiments, the program storage memory stores software programs and the memory for non-persistent data stores intermediate data and operating results. An input/output port 2708 provides connectivity to external devices, e.g., a wireless adaptor or wireless cradle. In one or more embodiments, the input/output port 2708 is a bi-directional connection such as a mini-A USB port. Also included in the handheld graphing calculator 2700 is an I/O interface 2710. The I/O interface 2710 provides an interface to couple input devices such as the keypad 2702 to the processor 2701. In some embodiments, the handheld calculator 2700 may also include an integrated wireless interface (not shown) or a port for connecting an external wireless interface (not shown).

In one or more embodiments, the memory unit 2712 stores software instructions to be executed by the processor 2701 to perform embodiments of Python program editing as described herein. Further, in some such embodiments, the memory unit 2712 stores software instructions of an operating system, a MicroPython interpreter, and other functionality that support such embodiments on the handheld graphing calculator 2700. Further, the memory unit 2712 stores built-in Python modules in accordance with embodiments described herein.

Other Embodiments

While the disclosure has been described with respect to a limited number of embodiments, those skilled in the art, having benefit of this disclosure, will appreciate that other embodiments can be devised which do not depart from the scope disclosed herein.

For example, embodiments have been described herein in which Python functions have one or two parameters with argument helpers. In some embodiments, arguments helpers can be provided for more than two parameters of a Python function.

In another example, embodiments have been described herein in which the Python program editor and the built-in Python modules with argument helpers for certain parameters execute on a handheld device. In some embodiments, such functionality may be used on other digital devices such as a laptop computer, a desktop computer, a smart phone, a tablet, etc. that executes software emulating the handheld device. For example, the TI-SmartView CE emulator from Texas Instruments may be installed on some such digital devices and may support embodiments as described herein.

In another example, embodiments are described herein in which an argument helper is automatically activated when a Python function having a parameter with the argument helper is selected by the programmer. In other embodiments, an argument helper is activated when the associated parameter is selected by the programmer rather than when the function is selected. Similarly, embodiments are described herein in which when a Python function has more than one parameter with an argument helper, the argument helpers for any parameters after the initial one are automatically activated in turn. In other embodiments, each argument helper for each parameter is activated when the programmer selects the parameter.

Software instructions implementing all or portions of the argument helper embodiments described herein may be initially stored in a non-transitory computer-readable medium and loaded and executed by one or more processors. In some cases, the software instructions may be distributed via removable non-transitory computer-readable media, via a transmission path from non-transitory computer-readable media on another digital system, etc. Examples of non-transitory computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the disclosure.

What is claimed is:

1. A method for Python programming on a handheld device, the method comprising:
    displaying, by a Python program editor in an editor screen, a Python function with a first indicator and a second indicator, wherein the first indicator indicates a first argument helper is available for activation for a first parameter of the Python function and the second indicator indicates a second argument helper for a second parameter of the Python function;
    activating, by the Python program editor executing on the handheld device and responsive to programmer input, the first argument helper for the first parameter of the Python function, wherein the first argument helper comprises first valid argument values for the first parameter;
    in response to the activating of the first argument helper, displaying, by the Python program editor, a first hint associated with a first valid argument value of the first valid argument values for the first parameter, wherein the first hint includes an explanation of the first valid argument value of the first valid argument values, wherein the explanation describes functionality associated with the first valid argument value of the first valid argument values;
    receiving, by the Python program editor, programmer selection of the first valid argument value of the first valid argument values;
    displaying, by the Python program editor, the Python function with the first valid argument value in the editor screen;
    prompting, by the Python program editor, an assignment of the Python function to a variable by placing an editor cursor at a beginning of a line that includes the Python function; and
    in response to the Python function including the assignment to the variable and no additional parameters are required for the Python function, placing, by the Python program editor, the editor cursor at an end of the line that includes the Python function.

2. The method of claim 1, wherein the programmer input comprises selection of the Python function in the editor screen displayed by the Python program editor.

3. The method of claim 1, wherein the programmer input comprises selection of the first parameter in the editor screen displayed by the Python program editor.

4. The method of claim 1, further comprising:
    activating, by the Python program editor, the second argument helper for the second parameter of the Python function after the receiving of the programmer selection of the first valid argument value, wherein the second argument helper comprises second valid argument values for the second parameter; and
    receiving, by the Python program editor, programmer selection of a second valid argument value of the second valid argument values,
    wherein the displaying further comprises displaying, by the Python program editor in the editor screen, the Python function with the first valid argument value and the second valid argument value.

5. The method of claim 1, wherein the handheld device is emulated on a digital device.

6. The method of claim 1, wherein:
    the Python program editor displays, in the editor screen, the first indicator to a left of the Python function and the second indicator to a right of the Python function.

7. The method of claim 6, wherein:
    the first indicator is a first arrow; and
    the second indicator is a second arrow.

8. A handheld device comprising:
    a non-transitory computer-readable medium storing software instructions for Python programming that are operable when executed to:
    display, by a Python program editor in an editor screen, a Python function with a first indicator and a second indicator, wherein the first indicator indicates a first argument helper is available for activation for a first parameter of the Python function and the second indicator indicates a second argument helper for a second parameter of the Python function;
    activate, by the Python program editor executing on the handheld device and responsive to programmer input, the first argument helper for the first parameter of the Python function, wherein the first argument helper comprises first valid argument values for the first parameter;

in response to the activating of the first argument helper, display, by the Python program editor, a first hint associated with a first valid argument value of the first valid argument values for the first parameter, wherein the first hint includes an explanation of the first valid argument value of the first valid argument values, wherein the explanation describes functionality associated with the first valid argument value of the first valid argument values;

receive, by the Python program editor, programmer selection of the first valid argument value of the first valid argument values;

display, by the Python program editor, the Python function with the first valid argument value in the editor screen;

in response to the Python function being unassigned to a variable, prompt, by the Python program editor, an assignment of the Python function to the variable by placing an editor cursor at a beginning of a line that includes the Python function; and in response to the Python function including the assignment to the variable and no additional parameters are required for the Python function, place, by the Python program editor, the editor cursor at an end of the line that includes the Python function; and at least one processor coupled to the non-transitory computer-readable medium to execute the software instructions.

9. The handheld device of claim 8, wherein the programmer input comprises selection of the Python function in the editor screen displayed by the Python program editor.

10. The handheld device of claim 8, wherein the programmer input comprises selection of the first parameter in the editor screen displayed by the Python program editor.

11. The handheld device of claim 8, wherein the software instructions further comprise software instructions to:
activate, by the Python program editor, the second argument helper for the second parameter of the Python function after the receiving of the programmer selection of the first valid argument value, wherein the second argument helper comprises second valid argument values for the second parameter; and receive, by the Python program editor, programmer selection of a second valid argument value of the second valid argument values, wherein the software instructions to display further comprise software instructions to display, by the Python program editor in the editor screen, the Python function with the first valid argument value and the second valid argument value.

12. The handheld device of claim 8, wherein:
the Python program editor displays, in the editor screen, the first indicator to a left of the Python function and the second indicator to a right of the Python function.

13. The handheld device of claim 12, wherein:
the first indicator is a first arrow; and
the second indicator is a second arrow.

\* \* \* \* \*